United States Patent [19]
Kizu et al.

[11] Patent Number: 5,140,252
[45] Date of Patent: Aug. 18, 1992

[54] METHOD OF CHARGING SECONDARY BATTERIES

[75] Inventors: Masanobu Kizu, Osaka; Ryo Nagai, Hirakata; Toshio Ohshima; Tsunemi Ohiwa, both of Osaka; Kozo Kajita, Shiga, all of Japan

[73] Assignee: Hitachi Maxell, Ltd., Osaka, Japan

[21] Appl. No.: 661,613

[22] Filed: Feb. 28, 1991

[30] Foreign Application Priority Data

Feb. 28, 1990 [JP] Japan .................................. 2-50495
Apr. 16, 1990 [JP] Japan .................................. 2-100687

[51] Int. Cl.$^5$ .............................................. H02J 7/00
[52] U.S. Cl. ................................................ 320/20; 320/39
[58] Field of Search ..................................... 320/20, 39

[56] References Cited

U.S. PATENT DOCUMENTS 4,034,279 7/1977 Nilsson ................................. 320/20

Primary Examiner—R. J. Hickey
Attorney, Agent, or Firm—Birch, Stewart, Kolasch & Birch

[57] ABSTRACT

In a method of charging secondary battery, the charging control is performed when it is detected that the secondary differential value of the detected voltage curve changes from positive value to a negative value at the point C or its near portion.

12 Claims, 5 Drawing Sheets

Fig. 2
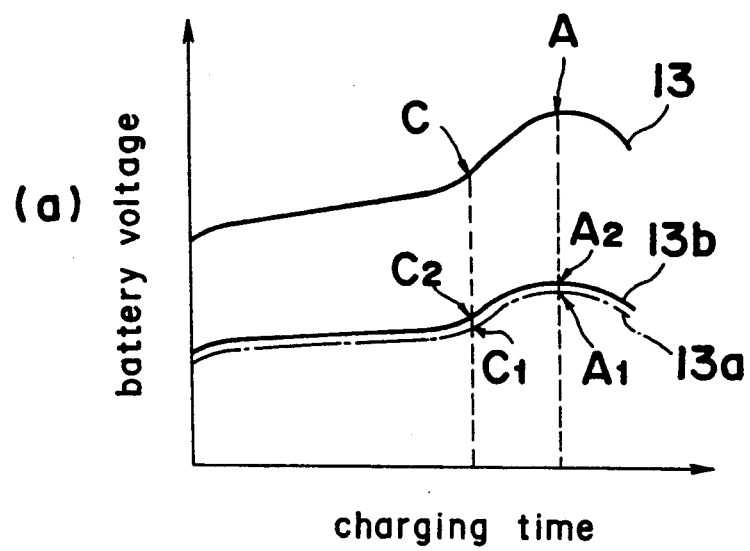
(a)
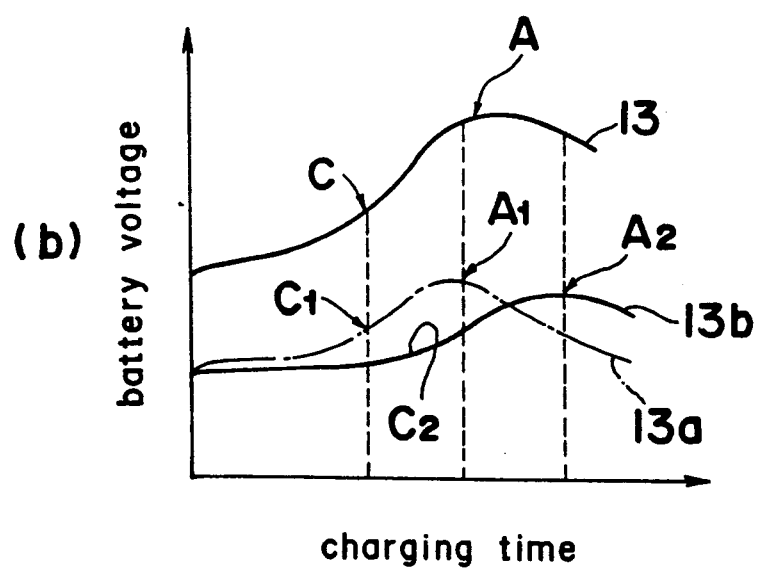
(b)

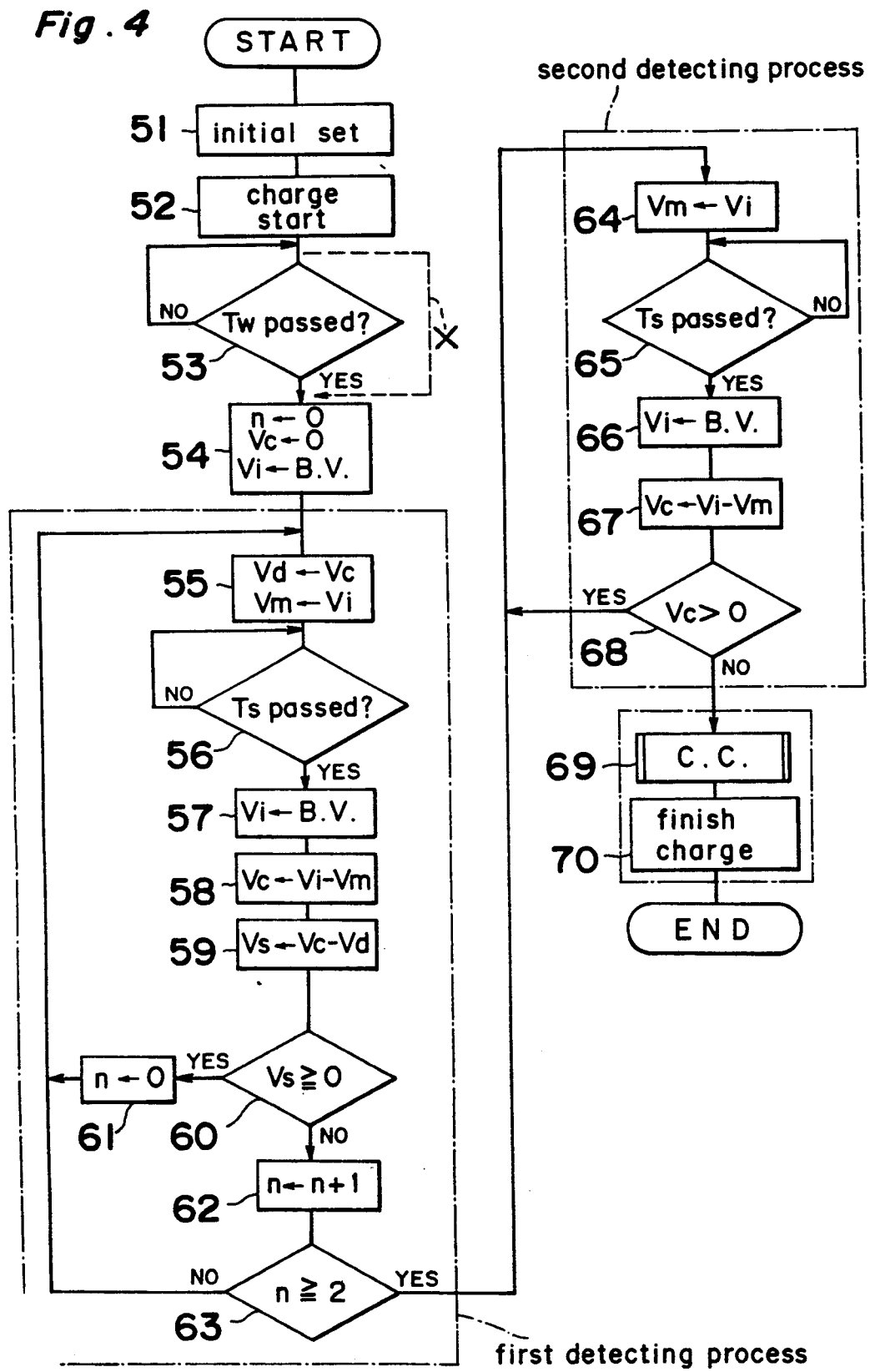

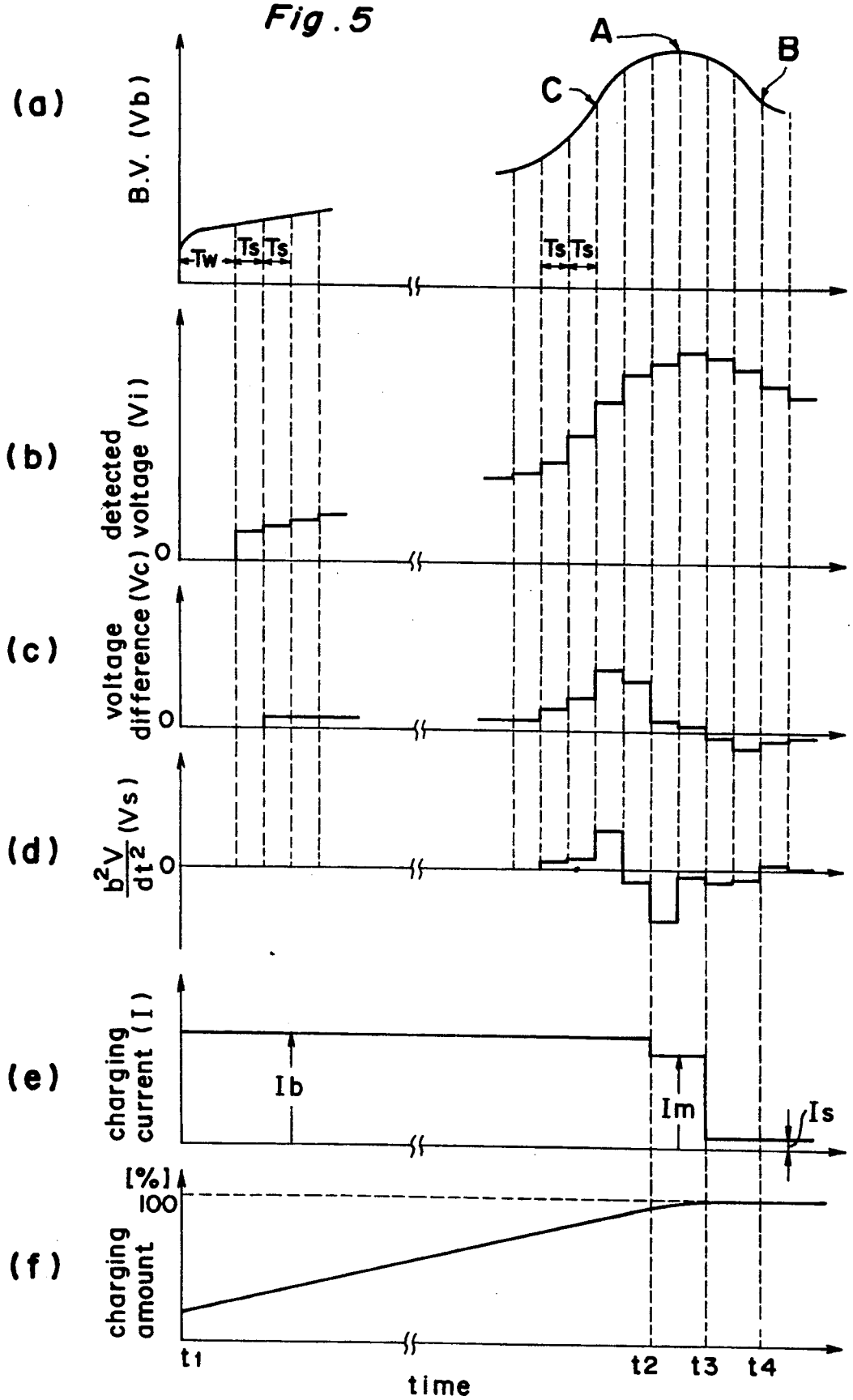

METHOD OF CHARGING SECONDARY BATTERIES

BACKGROUND OF THE INVENTION

1. Field of the Invention

The present invention relates to a method of charging secondary batteries.

2. Description of the Prior Art

As a method of conventional charging a secondary battery, as shown in FIG. 1 (a), in general there is used a charging value control in which a battery has a peak point A in a end of charging completion during a charging, whereby a time point B is reduced a predetermined voltage.

It is known that, during the secondary battery charging, there occurs a peak voltage point A in a charge voltage curve as shown in FIG. 1 (a) at the end of the charging operation. According to the conventional charging method, in order to control the charging value it is generally known to use the peak point A or to detect other time point B where the battery voltage drops from the peak voltage A.

It is known to detect the voltage of the secondary battery during charging for controlling the charging current when the change of the battery voltage exceeds a predetermined value (Japanese patent publication 53-40695).

However, it is very difficult to detect accurately whether the voltage reaches the peak value by detecting only the voltage change and to avoid a detection error because the voltage change per unit time near the peak point A of the charge voltage and such small voltage change occurs not only near the peak point A but other various places.

The second method of detecting the time point B when a voltage $\Delta V$ is reached, has an advantage that it is easier to detect the timing of the current control than the first mentioned method, but disadvantage is that the charged value changes battery by battery because the time point B fluctuates for the fixed voltage V due to the fact that the charging characteristic curve greatly change by the amount of the charging current and room temperature. In particular, since in the recently developed nickel hydrogen battery the voltage drop from peak point is small, so that the above mentioned problem still occurs.

In the third mentioned method, in which the gradient of the charging voltage curve is detected, the setting value is settable easier than the previous methods, it is difficult to control the charging current optimum by only detecting the period of time when the voltage change exceeds a predetermined value.

A further problem occurs when a pair of batteries are subjected to charging using any of the above mentioned charging methods. According to the conventional methods, if bad a battery is mixed or one or more batteries with relatively highly charged batteries are mixed, they tend to be overcharged, so that the cyclic charging property of the batteries may be deteriorated.

SUMMARY OF THE INVENTION

As a result of study, the inventors have found that every charging voltage curve shows a specific pattern where there is a relatively small battery voltage increase till a intermediate period of the charging period is reached which is independent of the various charging conditions such as an amount of the charging current, room temperature as shown in FIG. 1 (a), while at the end of the full charging period, the battery voltage abruptly increases, reaching a peak, thereafter decreasing gradually. More specifically, the inventors have found that there appears always a curve point C on the charging voltage curve intermediate the end of the charging period and there appears a period corresponding to the charge completion period in which the change of the battery voltage varies from zero to minus maximum value.

By analyzing the primary differential value of the charging voltage curve, which is a change of the charging voltage per unit time dV/dt, there is a peak of a positive (plus) projecting peak just before the peak A as shown in FIG. 1 (a) and the change of the battery voltage before and after the projected peak is sufficiently large.

The gradient $d^2V/dt^2$ of the change of the battery voltage, that is a secondary differential value varies from plus to minus abruptly before the curve C as shown in FIG. 1 (c).

The secondary batteries having large voltage drop near the full charge completion point B, also show battery voltage change similar to the battery voltage change at the curve point C.

Accordingly, the timing of occurrence of the curve point C and the full charge completion point B can be easily detected by detecting the change of the secondary differentiation of the charge voltage curve. The time points B and C correspond to only a timing when the charge value reaches a specific value irrespective of the charging condition. Therefore the time points B or C can be used as a signal for starting the charging control.

Similarly, as a result of analysis of the battery voltage curve of a pair of batteries, when the pair batteries are charged, the inventors have found that the curve point C on the battery voltage curve of the pair batteries generally coincides with the respective curve point C1 and C2 of the individual batteries 13a and 13b so long as the batteries 13a and 13b are both in an initial condition at which both batteries have a similar battery characteristics as shown in FIG. 2 (a). However, when these occur different battery characteristics in respective batteries occur after repetition of the charge and discharge cycles, the curve point C and the peak point A of the pair batteries are shown by the curve point C1 and the peak point A1 of a battery which has discharged least.

The present invention is made base on the inventor's findings mentioned above and has as its object to provide a method of charging a secondary battery in which charging can be easily and correctly performed irrespective of difference of the charging conditions.

A further object of the present invention is to provide a method of charging secondary battery in which the full charge completion can be detected.

A still further object of the present invention is to provide a method of charging pair batteries preventing over charging.

In order to accomplish the object, there is provided a charging method comprising a first detecting process for detecting a time point C which the secondary differential value of the battery voltage curve changes from a plus value to a minus value and a charging control process operated in response to the detection operation of the first detecting process.

These objects are provided by a second detecting process for detecting the charging period in such a period of time that change of the battery voltage per unit time is zero or a negative maximum value. Such a period occurs after the first detection operation. It is desirable that the charging control process is performed in response to the second detecting process.

In the charging control process, the charging operation can be continued with a charging current decreased from the current used in the period before the charging control process. It is desired to perform a trickle charging after the charging control process is finished.

As the secondary battery, there may be used a pair batteries in which a plurality of batteries are connected in parallel or in series.

According to the charging method of the present invention, when the charging operation is started, the battery voltage Vb increases along a similar shape curve irrespective of charging conditions such as the charging voltage, room temperature.

When the charge to the secondary battery comes to near the end, there appears a curve point C in which the charging voltage curve abruptly rises up. The first differentiation value of the battery voltage curve or the change of the battery voltage per unit time changes in a positive projection shape as shown in FIG. 1(b). Further the secondary differential curve of the battery voltage S changes as a reversed S character shape from the positive value to the minus value around the curve point C.

Therefore, by obtaining the second differentiation value of the battery voltage and detecting the point where the sign of the value changes from plus to minus, the curve point C can be obtained. It is noted that the charging amount of the secondary battery at the curve point C can be determined unequivocally for similar kinds of batteries by experiment. After the curve point is detected, by performing charging so as to charge the battery up to 100% of the battery capacity as shown in FIG. 1(d) by using a timer control for example, an accurate charging control can be made without excessive charging or inexcessive charging.

Furthermore, the change of the battery voltage becomes zero at the peak point A on the battery voltage curve, the voltage change becomes negative minimum value at the time point when the battery voltage is dropped by a predetermined value after the peak point A.

Accordingly, the time period when he battery is fully charged can be determined by detecting at least either a time point when the battery voltage change changes from plus to minus or a time point when the battery voltage change becomes a negative minimum value.

BRIEF DESCRIPTION OF THE DRAWINGS

FIGS. 2(a) and 2(b) are graphs showing characteristics of the pair of batteries and in which FIG. 2 (a) shows the case in which the pair of battery characteristics are equivalent and FIG. 2 (b) is where the characteristics of the pair of batteries are different, FIG. 4 is a flow chart showing the operations of the embodiment shown in FIG. 3, and FIGS. 5 (a) to 5 (f) show various curves showing the operation of the arrangement shown in FIG. 4.

DETAILED DESCRIPTION OF THE PREFERRED EMBODIMENT

Figure 3:
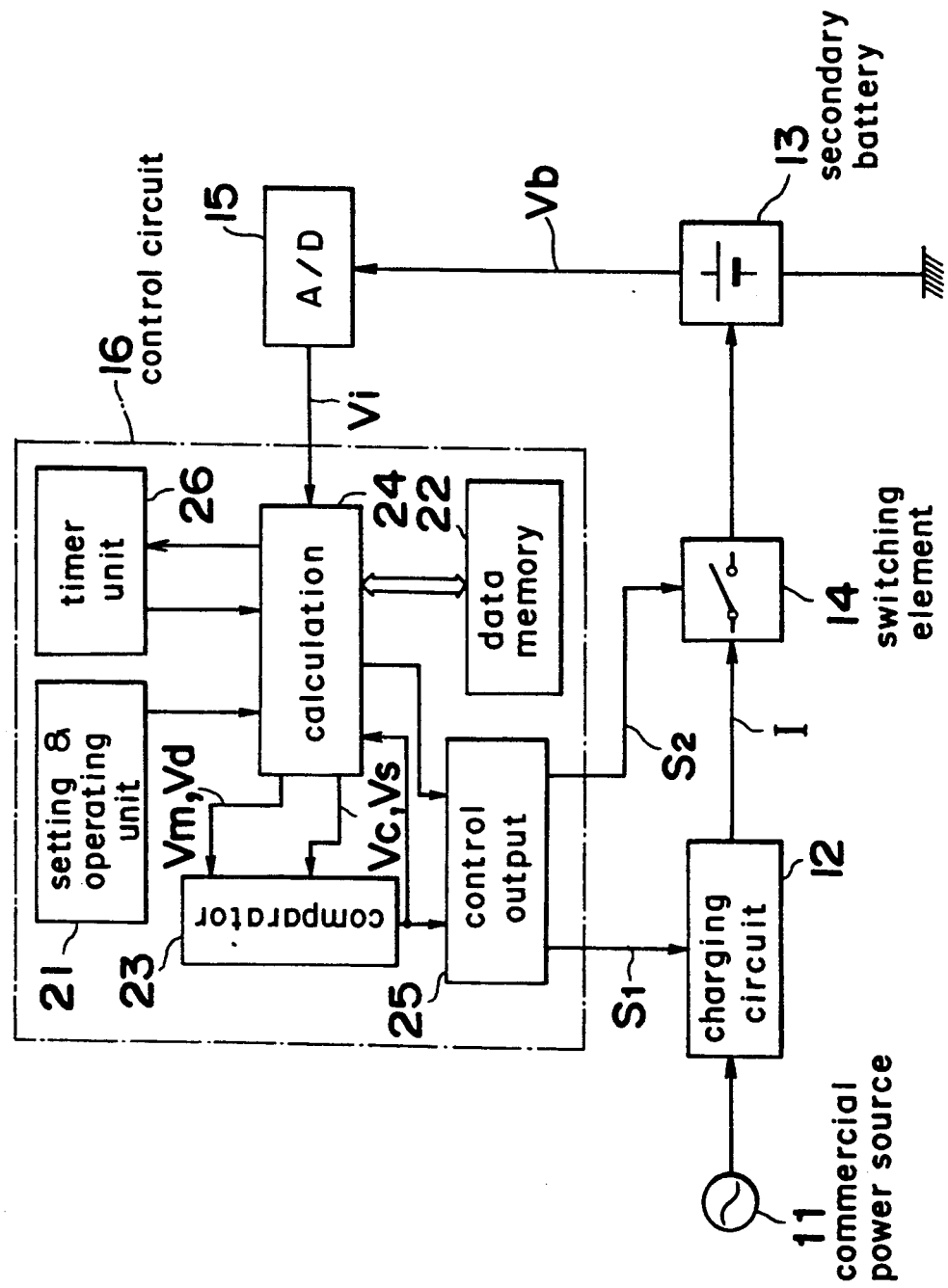
FIG. 3 is a block diagram of the circuit arrangement of a preferred embodiment of the present invention.

As shown in FIG. 3 the charging device comprises a charging circuit 12 for commutating commercial A.C. power source 11 and for outputting D.C. current I, a switching element 14 for controlling period of time of passing the current of the output of the charging circuit 12 to a secondary battery 13, a A/D converter 15 for converting the terminal voltage of the secondary battery into a digital value and a control circuit 16 for controlling the charge operation of the secondary battery 13 by receiving the output data from the A/D converter 15.

The charging circuit 12 consists of a constant current source and is changeable in output current I by several steps in response to the control signal S1 fed from the control circuit 16.

As the switching element 14, a relay or semiconductor switch or the like may be used. The switching element 14 is placed between the charging circuit 12 and secondary battery, being turned on and off in response to the control signal S2 fed from the control circuit 16, thereby controlling the conductive period to the secondary battery 13.

The A/D converter 15 samples the voltage Vb of the secondary battery 13 intermittently, converting the analog value of the secondary battery voltage Vb into a digital signal of a predetermined number of bits for inputting the digital signal into the control circuit 16 as the voltage data Vi.

As the control circuit 16, typically a microcomputer provided with a CPU and a memory is used to provide completely or partially the circuit arrangement as shown in FIG. 3 by suitable software or programming stored in a ROM in the microcomputer. The control circuit 16 comprises a setting operation unit 21 for setting various conditions such as charging condition, a data memory 22 for temporarily storing the data of the detected voltage Vi from the A/D converter 15, a comparator 23 for determining whether or not charge in the battery 13 is full by a calculation using a change of the charge voltage Vb, a calculation unit 24 for determining the optimum charging time and charging current corresponding to the result of comparison in the comparator 23, a control output unit 25 for outputting the control signals S1, S2 corresponding to the calculation results in the calculation unit 24 and a timer unit 26 for outputting various timer signals.

Operation

The operation of the control circuit 16 is explained with reference to the flow chart of FIG. 4 and the time related diagram shown in FIG. 5.

First, before starting charge operation, various initial settings such as charge current Ib (FIG. 5e) before detecting the curve point C, charge current Im after curve point detecting, charge current Is after full charging detection are performed in the setting operation nit 21 in step 51.

When a start switch (not shown) is turned on at the period t1, the control signal S1 corresponding to the charge current Ib is fed to the charging circuit 12 from the control output unit 25, whereby the output current I from the charge circuit 12 is set to Ib.

Simultaneously, control signal S2 for indicating to turn on the switching element 14 is given from the control output unit 25 and the charging circuit 12 and the secondary battery 13 conduct and a rapid charging begins with a predetermined charge current at step 52.

Figure 1:
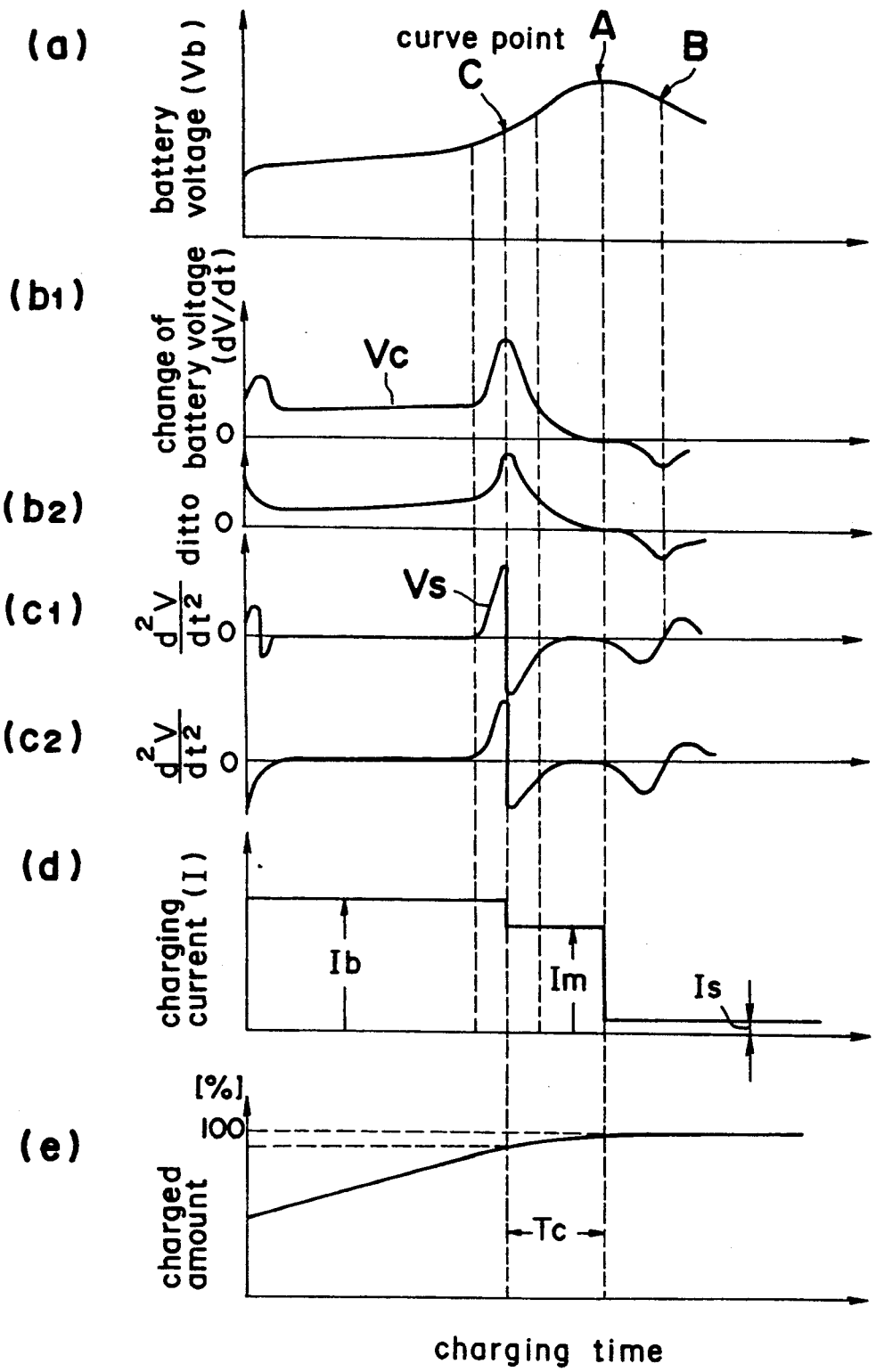
FIGS. 1(a) to 1(e) show graphs for explaining the essential structure of the present invention in which FIG. 1 (a) shows charge characteristic of a battery voltage, 1 (b) is a change per unit time of the battery voltage, 1 (c) shows the change of the secondary differential value of the battery voltage curve, 1 (d) shows a control condition of the charging current and 1 (e) shows charging current value characteristic.

It is noted that there are two kinds of batteries with respect to the voltage change in the initial charging period. These two kinds of batteries are identified by suffix 1 and 2 and the value dV/dt is shown in FIG. 1 (b) and $d^2V/dt^2$ shown in FIG. 1 (c).

In step 53 the timer unit 26 is operated, so that before reading in the battery voltage Vb of the secondary battery 13 in the first time, a waiting time Tw (min.) is intentionally set. Since the change of the battery voltage Vb is large and unstable directly after charge starting as shown in FIG. 5 (a), the waiting time Tw is expressed as $$Tw = Kw/Ib$$

wherein Kw is a suitable coefficient corresponding to the charge condition. In the present example, Kw is set to 5 and the unit of Ib is the charging rate C which shows that charging is completed 100% for an hour. An erroneous detection of the curve point C can be prevented by waiting for reading the voltage for the above time Tw. It is noted that for the batteries as shown in FIG. 1 ($c_2$) in which the sign of the value $d^2V/dt^2$ is reversed at the time of the charge start, there is no need to provide such a waiting time (step 53) as shown in dotted lines X.

When it is determined that the waiting time Tw is lapsed, the battery voltage Vb is read into the calculation unit 24 as Vi through the A/D converter 15 in step 54, the variation n and Vc are initialized then the first detecting process for detecting the curve point C is performed.

In step 55 the battery voltage Vi and a difference voltage Vc are stored in the data memory 22. In addition, in step 56 the time interval Ts (min.) for reading in the battery voltage Vb is set. That is, the voltage change per unit time (dV/dt) of the battery voltage Vb is proportional to the charging current Ib. In the present embodiment, the voltage differences Vc between each detected voltage Vi are adapted substantially to be equal in spite of the charging current Ib by reading intermittently the battery voltage Vb in the time interval obtained by the equation Ts=Ks/Ib, wherein Ks is a coefficient corresponding to the charge condition and in the present example Ks is 5.

When the time Ts is lapsed he battery voltage Vi is read in step 57, thereafter, the voltage difference Vc between the voltage Vi detected this time and the voltage Vm detected the last time and stored in the data memory 22 is calculated in the calculation unit 24 in step 58. In step 59, the voltage difference Vs between the voltage difference Vc calculated at this time and the voltage difference Vd calculated at the last time is calculated thereby obtaining secondary differential value in the battery voltage curve can be calculated.

The secondary differential value in the voltage curve changes abruptly from a positive sign direction to a negative sign direction about the curve point C as shown in FIG. 1 (c). Accordingly, in the present embodiment it is judged that the battery voltage Vb has passed the curve point C when the secondary differential value Vs changes to the negative value.

If it is judged as the curve point when just the value Vs become negative there may occur an error caused by noise. In order to avoid this error, there are set times n that the value Vs repeats the negative sign, so that when the sign is positive the value n is kept 0 in step 61. On the other hand, every time the negative sign is detected n is increased by 1 in step 62, when, for example, two consecutive negative signs are detected (at time t2) in step 63, the process goes to the second detecting process.

In the second detecting process, the difference voltage Vc is detected in steps from 64 to 6 similar to those in the first detecting process, thereafter, when it is detected that the difference voltage Vc is 0 or negative in step 68, that time point t3 is judged as the peak point A, the control signal S2 is fed to the switching element 14 from the control unit 25 after given charge control processes are performed in step 69, the charge operation is finished in step 70.

The charge control process 69 is performed corresponding to the contents of the setting operation unit 21 or detection of the charging condition in response to the charge conditions such as charging current value. However, this step may be omitted if possible and the process may go to step 70 to end the charge operation.

However, in the present embodiment, the charging current I is decreased from Ib to Im which is slightly smaller than Ib after detection time t1 of the curve point C, thereafter, the charging current I is further decreased to a current Is which is smaller than the current Im after detection of the peak point A so as to perform a trickle charging.

In the embodiment mentioned above, although the charging current value is controlled by judging the full charging at the time when the difference voltage becomes negative as shown in FIG. 5 (c), it is possible to detect the time point when the charging current changes below a small predetermined positive value.

When the battery voltage abruptly drops after the battery voltage reaches the peak value, it is possible to arrange the control circuit 16 to detect the time point t4 during which the difference voltage Vc becomes a negative maximum value in place of and/or in addition to the second detecting process as shown in FIG. 5c. This is also the value Vs obtained by further differentiating and changes from the negative value to the positive value as shown in FIG. 5 (d). Accordingly, by differentiating similar to the first detecting process, and obtaining the time when this value changes from negative value to the positive value a more accurate full charging period can be detected.

What is claimed is:

1. A method of charging an electrical battery, comprising the steps of:
   (a) setting an initial current value of charging current;
   (b) detecting the battery voltage at the beginning and end of a plurality of charging time intervals;
   (c) determining a first voltage value of the difference in the battery voltage at the beginning and end of successive charging time intervals;
   (d) determining a second voltage value of the difference between two successive first voltage values; and
   (e) reducing the value of charging current from said initial current value to a lesser current value when said second voltage value thereafter changes from a positive value to a negative value.

2. The method of claim 1 wherein said step (e) of reducing comprises reducing the value of charging current to said lesser current value when said second voltage value thereafter changes from a positive value to a negative value for at least two successive time intervals.

3. The method of claim 1, and additionally including the step of:

(f) reducing the current value of charging current from said lesser current value to a still lesser current value when said first voltage value thereafter goes to a zero value or a negative value.

4. The method of claim 3 and additionally including the step of:

(f) determining when said first voltage value reaches a maximum negative value for indicating a full charge condition of said battery.

5. The method of claim 3 and additionally including the step of:

(f) determining when said second voltage value thereafter changes to a positive value for indicating a full charge condition of said battery.

6. The method of claim 3 and additionally includes the step of:

(f) determining when said first voltage value reaches a maximum negative value or said second voltage value changes to a positive value; and (g) terminating charging of said electrical battery.

7. The method of claim 1 and additionally including the step of:

(f) waiting for a predetermined time interval prior to initially performing steps (b) through (e).

8. A method of charging an electrical battery, comprising the steps of:

(a) setting an initial current value of charging current;

(b) detecting the battery voltage at the beginning and end of at least two successive charging time intervals;

(c) determining a first voltage value of the difference in the battery voltage at the beginning and of said successive charging time intervals;

(d) determining a second voltage value of the difference between two successive first voltage values;

(e) reducing the value of charging current to a first lower current value when said second voltage value thereafter changes from a positive value to a negative value;

(f) reducing the value of charging current to a second lower current value when said first voltage value thereafter goes to a zero value or a negative value; and (g) determining when said first voltage value reaches a maximum negative value or said second voltage value goes to a positive value for indicating a full charge condition of said battery.

9. The method of claim 8 and additionally including the step of:

(h) terminating the charging of said battery.

10. The method of claim 8 and additionally including the step of:

(h) delaying steps (a)–(g) for a predetermined initial time interval.

11. The method of claim 8 wherein said first lower current value is greater than said second lower current value.

12. The method of claim 11 wherein said second lower current value comprises a trickle current value.

* * * * *